(12) United States Patent
Morozumi et al.

(10) Patent No.: US 9,885,425 B2
(45) Date of Patent: Feb. 6, 2018

(54) VALVE SYSTEM

(75) Inventors: Akio Morozumi, Matsumoto (JP);
Manabu Fukuda, Matsumoto (JP)

(73) Assignee: T&D CORPORATION,
Matsumoto-Shi, Nagano (JP)

( * ) Notice: Subject to any disclaimer, the term of this patent is extended or adjusted under 35 U.S.C. 154(b) by 35 days.

(21) Appl. No.: 14/005,584

(22) PCT Filed: Mar. 16, 2012

(86) PCT No.: PCT/JP2012/001857
§ 371 (c)(1),
(2), (4) Date: Oct. 16, 2013

(87) PCT Pub. No.: WO2012/124349
PCT Pub. Date: Sep. 20, 2012

(65) Prior Publication Data
US 2014/0217315 A1 Aug. 7, 2014

(30) Foreign Application Priority Data
Mar. 17, 2011 (JP) .................. 2011-059357

(51) Int. Cl.
*F16K 31/08* (2006.01)
*F16K 31/10* (2006.01)
(Continued)

(52) U.S. Cl.
CPC .......... *F16K 31/42* (2013.01); *F16K 27/0236* (2013.01); *F16K 31/088* (2013.01);
(Continued)

(58) Field of Classification Search
CPC .. F16K 27/0236; F16K 31/088; F16K 31/128; F16K 31/402; F16K 31/42; F16K 31/086
(Continued)

(56) References Cited

U.S. PATENT DOCUMENTS 3,240,128 A * 3/1966 Wilson .............................. 92/96
3,347,262 A 10/1967 Gibson
(Continued)

FOREIGN PATENT DOCUMENTS

DE 39 27 611 A1 9/1990
EP 0 888 709 A1 1/1999
(Continued)

OTHER PUBLICATIONS

Notification of Transmittal of Translation of the International Preliminary Report on Patentability Forms (PCT/IB/338 and PCT/IB/373) and the Written Opinion of the International Searching Authority (Form PCT/ISA/237) dated Sep. 17, 2013, by the International Bureau of WIPO in the corresponding International Application No. PCT/JP2012/001857. (8 pages).
(Continued)

*Primary Examiner* — Seth W MacKay-Smith
(74) *Attorney, Agent, or Firm* — Buchanan Ingersoll & Rooney PC

(57) ABSTRACT

A valve system has a main body including a valve element that controls flow of fluid between a plurality of ports and an operation unit capable of being detachably attached to the main body. The main body includes: a driving element that is operated from the outside by a magnetic force and directly or indirectly drives the valve element; and a first housing that houses the valve element and the driving element and is watertight in a state where pipes are connected to the plurality of ports. The operation unit includes: an operation element that generates a magnetic field that operates the driving element; and a second housing that houses the operation element, when attached to the first housing, the operation element and the driving element being in a facing state via part of a wall of the first housing and part of a wall of the second housing.

13 Claims, 2 Drawing Sheets

(51) Int. Cl.
*F16K 31/128* (2006.01)
*F16K 27/02* (2006.01)
*F16K 31/42* (2006.01)
*F16K 31/40* (2006.01)
*F16K 37/00* (2006.01)

(52) U.S. Cl.
CPC .......... *F16K 31/128* (2013.01); *F16K 31/402* (2013.01); *F16K 37/0041* (2013.01)

(58) Field of Classification Search
USPC ................................. 251/128, 129.03, 129.11
See application file for complete search history.

(56) References Cited

U.S. PATENT DOCUMENTS

| | | | | |
|---|---|---|---|---|
| 3,506,028 A * | 4/1970 | Kmiecik | ............... | F16K 31/088 137/412 |
| 3,727,160 A * | 4/1973 | Churchill | .............. | H01F 7/1607 335/251 |
| 3,747,892 A | 7/1973 | Gigantino et al. | | |
| 3,913,884 A * | 10/1975 | Rolfe | ...................... | F16K 31/402 251/30.02 |
| 3,989,066 A * | 11/1976 | Sturman et al. | ........... | 137/624.2 |
| 4,172,585 A * | 10/1979 | Rolfe | ...................... | F16K 31/408 251/175 |
| 4,412,517 A * | 11/1983 | Kobashi | ................. | F02M 3/075 123/339.26 |
| 4,503,887 A * | 3/1985 | Johnson | ................ | F16K 31/402 137/601.13 |
| 4,508,136 A * | 4/1985 | Kah, Jr. | ......................... | 137/218 |
| 4,725,802 A * | 2/1988 | Johnson | ................ | H01F 7/1607 335/258 |
| 4,736,177 A * | 4/1988 | Vollmer | .................... | H01F 7/16 335/299 |
| 4,967,996 A * | 11/1990 | Sonoda et al. | ............. | 251/30.02 |
| 5,000,224 A * | 3/1991 | Olson et al. | ............. | 137/624.12 |
| 5,169,117 A | 12/1992 | Huang | | |
| 5,294,089 A * | 3/1994 | LaMarca | ................. | F16K 31/42 251/30.02 |
| 5,449,142 A * | 9/1995 | Banick | .................... | F16K 31/404 251/30.04 |
| 5,565,832 A * | 10/1996 | Haller | ..................... | H01F 7/088 335/247 |
| 5,676,342 A * | 10/1997 | Otto | ...................... | F16K 31/404 251/30.02 |
| 5,887,847 A * | 3/1999 | Holborow | ............. | F16K 31/128 251/30.02 |
| 5,918,852 A * | 7/1999 | Otto | ...................... | F16K 31/404 251/118 |
| 6,016,836 A * | 1/2000 | Brunkhardt | .............. | 137/624.11 |
| 6,547,211 B2 * | 4/2003 | Roman | ...................... | 251/30.01 |
| 6,619,612 B2 * | 9/2003 | Freisinger | ............. | F16K 31/404 251/122 |
| 7,131,635 B2 * | 11/2006 | Oh | ................. | 251/292 |
| 8,104,510 B2 * | 1/2012 | Ams | ..................... | F16K 11/052 137/625.44 |
| 8,220,774 B2 * | 7/2012 | Borst | .................. | F16K 31/0634 251/129.08 |
| 8,297,312 B2 * | 10/2012 | Tai | ............................ | 137/624.16 |
| 8,632,054 B2 * | 1/2014 | Carlson et al. | ............... | 251/292 |
| 2002/0175791 A1 * | 11/2002 | LaMarca | ................. | H01F 7/081 335/220 |
| 2007/0164243 A1 * | 7/2007 | Volz | ...................... | F16K 11/044 251/30.03 |
| 2010/0264339 A1 * | 10/2010 | Morozumi | .............. | F16H 27/06 251/65 |

FOREIGN PATENT DOCUMENTS

| | | | | |
|---|---|---|---|---|
| EP | 1 672 261 A1 | 6/2006 | | |
| EP | 2 218 943 A1 | 8/2010 | | |
| GB | 1 444 393 A | 7/1976 | | |
| GB | 2076117 A * | 11/1981 | .......... | A01G 25/162 |
| GB | 2 149 148 A | 6/1985 | | |
| JP | 60-4684 A | 1/1985 | | |
| JP | 61-173876 U | 10/1986 | | |
| JP | 4-10173 U | 1/1992 | | |
| JP | 2000-220757 A | 8/2000 | | |
| JP | 2000-337551 A | 12/2000 | | |
| JP | 2000-356277 A | 12/2000 | | |
| JP | 2004-92664 A | 3/2004 | | |
| JP | 2010-59783 A | 3/2010 | | |
| WO | WO 2009/060860 A1 | 5/2009 | | |

OTHER PUBLICATIONS

Written Opinion (PCT/ISA/237) dated Jun. 26, 2012, by the Japanese Patent Office as the International Searching Authority for International Application No. PCT/JP2012/001857.
International Search Report (PCT/ISA/210) dated Jun. 26, 2012, by the Japanese Patent Office as the International Searching Authority for International Application No. PCT/JP2012/001857.
The extended European Search Report dated Jul. 22, 2014, by the European Patent Office in corresponding European Patent Application No. 12757712.0-1751. (7 pages).
ASCO RedHat brochure, Gas Shutoff Valves, p. 327, brochure sent from Examiner to Applicants' attorney via facsimile on Feb. 1, 2016 (2 pages).
ASCO Engineering Information Solenoid Valves, pp. 463-488, undated (25 pages).

* cited by examiner

//www.w3.org/1999/xhtml">
VALVE SYSTEM

TECHNICAL FIELD

The present invention relates to a valve that controls the flow of a fluid.

BACKGROUND ART

WO 2009/060860 discloses a valve directly or indirectly connected to a permanent magnet-type actuator. Such permanent magnet-type actuator includes a first permanent magnet and a second permanent magnet that face one another in a first direction and operates a valve by rotating the first permanent magnet using an operation transmitting body so that the north pole and the south pole are reversed to alternately produce attraction (a pulling force) and repulsion (a repelling force) between the first permanent magnet and the second permanent magnet, thereby causing the second permanent magnet to move reciprocally in the first direction.

Japanese Laid-Open Patent Publication No. 2010-59783 discloses provision of an automatic flushing apparatus that is highly reliable and easy to maintain. The automatic flushing apparatus of this publication is a bathroom flusher including a body, the body including: an inlet connected to a supply line and an outlet connected to a flushing conduit; a valve assembly in the body positioned to close water flow between the inlet and the outlet upon a sealing action of a soft member at a lip seal and thereby controlling flow from the inlet to the outlet; and an actuator for actuating operation of the moving member.

Battery-powered valve systems include systems where the actuator is removable for battery replacement and the like. In the flushing apparatus described above, the valve element is pressed onto a valve seat by a spring force incorporated in the valve body to stop the flow of water to the flow path. However, in many cases, leaks occur due to reasons such as the spring force being insufficient and/or an insufficient seal between the valve element and the valve seat. Also, in a valve that uses a pilot valve, leaks can occur from the pilot valve. Accordingly, there is demand for a valve where leaks do not occur and where the operation part can be easily removed and replaced for battery replacement or the like.

SUMMARY OF THE INVENTION

One aspect of the present invention is a valve system including: a main body including a valve element that controls flow of fluid between a plurality of ports; and an operation unit capable of being detachably attached to the main body. The main body includes: a driving element that is operated from the outside by a magnetic force and directly or indirectly drives the valve element; and a first housing that houses the valve element and the driving element and is watertight in a state where pipes (hoses) are connected to the plurality of ports. The operation unit includes: an operation element that generates a magnetic field that operates the driving element; and a second housing that houses the operation element, when attached to the first housing, the operation element and the driving element being in a facing state via part of a wall of the first housing and part of a wall of the second housing.

In this valve system, the first housing of the main body is typically sealed aside from the plurality of ports so as to the valve element and the driving element are covered in a state where it is not possible to physically touch directly from the outside. Accordingly, it is possible to exclude the possibility of leaks to the outside through the valve element and the driving element and it is possible to exclude the risk of leaks occurring from the main body when the operation unit has been removed. Although the first housing of the main body houses the valve element and the driving element in a state that cannot be mechanically accessed, when the operation unit is attached to the main body, the operation element and the driving element are autonomously placed in a state facing each other and the operation element moves the driving element via a magnetic force (magnetic field). By such configuration, on the main body side, the valve element is moved via the driving element to control the flow of fluid.

The first housing and the second housing should preferably respectively include configurations (arrangement, structures, constructions) for determining positions when the second housing is attached to the first housing. Typical configurations are a convex portion and a concave portion capable of fitting together. As one example, part of the wall of the first housing may be a convex portion and part of the wall of the second housing may be a concave portion, or the opposite arrangement may be used.

If the operation unit includes a display panel, it is desirable for the second housing to be attached so that the angle relative to the first housing around the configurations for determining the positions changes. If one of the configurations that determines the position of the first housing and the second housing is column-shaped, it is possible to assemble the second housing with the first housing so as to rotate around the column shape and to adjust the position or orientation of the display panel with respect to the main body. It is also effective to provide the constructions for determining the positions at positions that are off-center with respect to at least one of the first housing and the second housing.

One driving element is a pilot valve that drives the valve element via a fluid. By controlling the valve element via the pilot valve, it is possible to reduce the force or displacement to operate the driving element using the operation element.

The operation unit may supply a magnetic field that moves the driving element in one direction. By attaching the operation unit, it is possible to fix the valve element at open or closed. The operation unit should preferably include: an electric actuator that drives the operation element; and a control unit that controls the electric actuator. If the control unit is programmable, it is possible to program the control unit when the operation unit is separated from the main body then the operation unit is attached. The operation unit should preferably include a first operation unit that sets a schedule for operating the operation element using the control unit. In addition, the operation unit should preferably further include a second operation unit that manually operates the operation element using the control unit.

DETAIL DESCRIPTION

Figure 1:
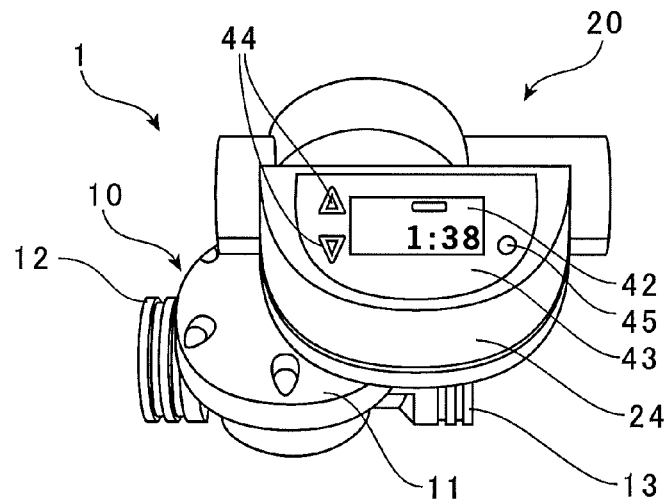
FIG. 1 is a perspective view showing an overview of a valve system.
Figure 2:
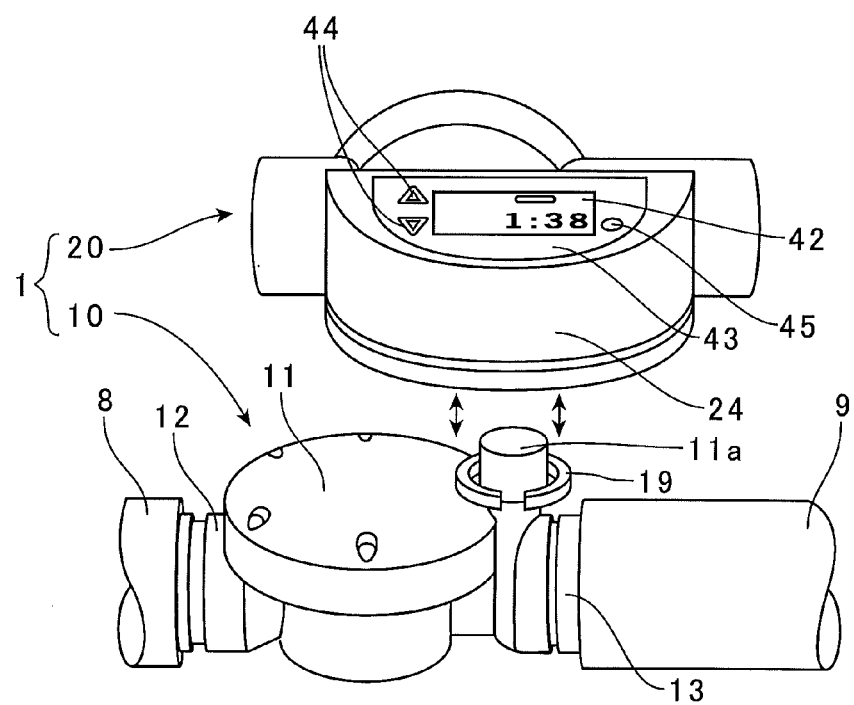
FIG. 2 is a perspective view showing a state where an operation unit has been separated from a main body.

FIG. 1 shows an overview of a valve system (valve) 1 including a main body 10 and an operation unit 20 detachably attached to the main body 10. FIG. 2 shows a state where the operation unit 20 has been removed from the main body 10 of the valve system 1. The valve system 1 connects a first pipe or hose 8 and a second pipe or hose 9 and functions so as to control the flow of a fluid, typically water, between such hoses 8 and 9.

Figure 3:
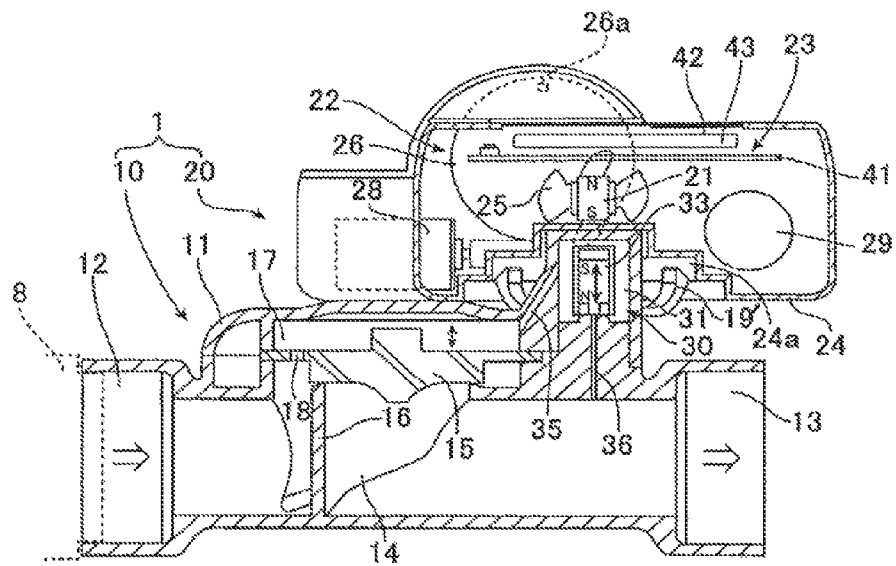
FIG. 3 is a cross-sectional view showing the overall configuration of the valve system.
Figure 4:
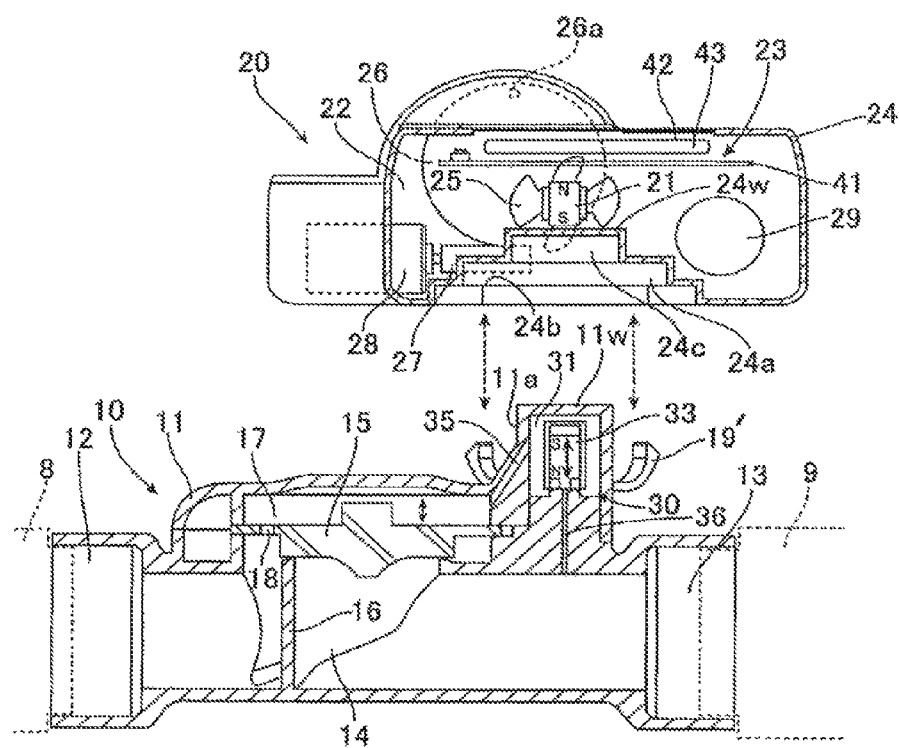
FIG. 4 is a cross-sectional view showing the overall configuration of the valve system and shows a state where the operation unit has been separated from the main body.

FIG. 3 shows the overall internal configuration of the valve system 1 in a state where the operation unit 20 has been attached to the main body 10. FIG. 4 shows the overall internal configuration of the valve system 1 in a state where the operation unit 20 has been removed from the main body 10.

The main body 10 of the valve system 1 includes two ports 12 and 13 that connect the hoses 8 and 9, a valve housing (valve body, first housing) 11 that forms a flow path 14 connecting the ports 12 and 13, and a diaphragm (valve element) 15 that opens and closes the flow path 14. The housing 11 and the diaphragm 15 are made of resin such as PTFE. The diaphragm 15 moves up and down inside a valve chamber 17 at the top of the housing 11 to open and close the flow path 14 inside the housing 11. That is, the diaphragm 15 is capable of moving downward to contact (make tight contact with) a partition 16 inside the flow path 14 and shut off the flow of water between the ports 12 and 13 and the diaphragm 15 is capable of moving upward and away from the partition 16 to open the flow of water between the ports 12 and 13.

The main body 10 further includes a pilot valve 30 that drives the diaphragm 15 via fluid inside the housing 11. The pilot valve 30 includes a pilot valve chamber 31, which is connected via a flow path 35 to the valve chamber 17 above the diaphragm 15, and a pilot valve element (pilot valve body, driving element) 33, which moves inside the pilot valve chamber 31 to open and close a flow path 36 between the pilot valve chamber 31 and the port 13. The pilot valve element 33 includes a magnet, typically a permanent magnet (bar magnet), with a north pole and a south pole and moves up and down inside the pilot valve chamber 31 due to a magnetic field provided from outside.

In the valve system 1, using the pressure of the fluid flowing from the port 12 to the port 13, it is possible to drive the diaphragm 15 that is the valve element and set the flow of the fluid on and off. First, the fluid that has flowed in from the port 12 flows into the valve chamber 17 via a flow path 18 provided in the diaphragm 15 or in the housing 11. When the pilot valve 30 is closed, the valve chamber 17 and the downstream port 13 are separated. This means that due to the pressure (pressure difference) of the fluid that has flowed into the valve chamber 17, the diaphragm 15 tightly adheres to the partition 16 and closes the flow path 14. When the pilot valve 30 is open, the valve chamber 17 and the downstream port 13 are connected via the pilot valve 30. This means that a pressure drop that causes the diaphragm 15 to shut off the flow path 14 between the valve chamber 17 and the port 13 is not produced and the diaphragm 15 becomes separated from the partition 16 to open the flow path 14.

Part of the wall of the housing 11 that houses the pilot valve element 33 is formed as a convex portion 11a protrudes cylindrically upward so that the operation unit 20 can be detachably attached to the convex portion 11a. In one embodiment illustrated in FIG. 2, a hook portion 19 that forms a stopper when attaching the operation unit 20 is attached to the outside of the convex portion 11a of the valve housing 11. Accordingly, in the valve system 1, the convex portion 11a of the housing 11 and a concave portion 24c of the housing 24 of the operation unit (described later) 20 form the configuration (constructions) for determining positions when attaching the housing 24 of the operation unit 20 to the valve housing 11.

The operation unit 20 that is detachably attached to the main body 10 includes an operation element 21 including a magnet, typically a permanent magnet (bar magnet) with a south pole and a north pole, that forms a magnetic field for operating the pilot valve element 33, an electric actuator 22 that rotates the operation element 21 by an appropriate unit angle, for example, a 180 degree pitch, to control the direction of the magnetic field that operates the pilot valve element 33, a control unit 23 that controls the electric actuator 22, and a housing (second housing, control box) 24 that is made of resin and houses the other components. A battery 29 is also housed in the operation unit 20.

The electric actuator 22 may be a solenoid type. In this example, the electric actuator 22 includes a Geneva drive (Maltese cross) 25 that rotates the bar magnet 21 that is the operation element with a 180 degree pitch, a spur-type driving gear 26 equipped with a driving pin 26a that drives the Geneva drive 25, a worm gear 27 that drives the driving gear 26, and an electric motor 28 that drives the worm gear 27. The combination of the Geneva drive 25 that rotates in units of an appropriate angle such as 90 or 180 degrees and the electric motor 28 that drives the Geneva drive 25 via an appropriate gear train controls the state of the operation element 21, for example, the on/off state by moving the Geneva drive 25.

In addition, so long as the electric motor 28 does not operate, the state of this electric actuator 22 will not change. This means that no power is consumed in maintaining the state. Accordingly, by combining the Geneva drive 25 and the electric motor 28, it is possible to provide the electric actuator 22 which, compared to a solenoid-type actuator, is low cost, compact, and also has extremely low power consumption. This means that battery driving is possible and a cable is unnecessary, and as one example it is possible to provide a valve system 1 that can remain in service for twelve months on a single lithium battery.

The control unit 23 includes a printed circuit board 41 on which general-purpose computer hardware resources, such as a CPU and memory, are mounted and an operation panel 43 on which a display 42 is mounted. As shown in FIG. 1, the operation panel 43 includes a display (display panel) 42 and operation buttons (operation unit) 44 and 45. The display 42 has a function for displaying the state of the valve system 1, a function that supports programming of the valve opening and closing, the present time, a battery level, and the like. The printed circuit board 41 has a function for programmable control of the opening and closing of the valve. The operation buttons (first operation unit) 44 have a function for setting a program. More specifically, by using the operation buttons 44, it is possible to set the timing at which the valve is to open and close and/or the time intervals of the valve is open or closed. In this valve system 1, the control unit 23 of the operation unit 20 carries out programmable control of the bar magnet 21 that is the operation element and as a result, the diaphragm 15 that is the valve element is controlled by program. Accordingly, by using the valve system 1, it is possible to control an irrigation start time using a timer and to control watering such as at intervals of several hours or intervals of several days.

The operation button (second operation unit) 45 has a function for switching the contents displayed on the display 42 and for confirming a numeric value set using the operation buttons 44. In addition, when a long press (two or more seconds) is made, the operation button 45 is capable of setting a state of the bar magnet 21 (which is the operation element) so that the diaphragm 15 is open. After this, by pressing the operation button 45 again, it is possible to set the operation element 21 in a state where the diaphragm 15 is controlled so as to be closed.

In this valve system 1, after the main body 10 has been attached to pipes or hoses, it is possible to remove the operation unit 20 from the main body 10 and use the operation buttons 44 and 45 to make set a program. As one example, it is possible to set or change the respective timers of the operation units 20 of a plurality of valve systems 1 at a single location even if the locations of the valve systems 1 are distributed. It is also possible to manually carry out on/off control of the valve system 1 using the operation button 45 in a state where the operation unit 20 is attached to the main body 10.

It is also possible to mount a wireless module on the printed circuit board 41 of the control unit 23 and to open and close the valve or to change the timer settings for opening and closing the valve by wireless communication from a remote location. It is also possible to mount various sensors, such as a motion sensor, temperature sensor, and a smoke sensor, on the operation panel 43 and to use the valve system 1 not only in an irrigation system but in a variety of applications including a bathroom flushing system and a fire extinguishing system.

The housing 24 of the operation unit 20 includes a part (concave portion) 24a where part of the wall of the housing 24 is cylindrically depressed so as to narrow in multiple steps toward the operation element 21. The operation unit 20 can be attached to the main body 10 by inserting the convex portion 11a of the housing 11 into the concave part 24a. In another embodiment illustrated in FIGS. 3 and 4, the entrance side 24b of the depressed part (concave part) 24a of the housing 24 of the operation unit 20 is wider than the inside 24c and is stepped so as to widen toward the outside so that the hook portion 19' provided around the convex portion 11a of the housing 11 can be inserted and held (engaged). The inner surface of the entrance side 24b of concave part 24a is machined into corrugated (concavo-convex) so as to mesh or engaged with the hook portion 19' around the convex portion 11a so that the housing 24 of the operation unit 20 can be attached to the valve housing 11 regardless of the position around the convex portion 11a to which the operation unit 20 has been rotated. The inside 24c of the depressed part 24a of the housing 24 is a cylindrical depression with an inner diameter that is substantially equal to the outer diameter of the convex portion 11a and is slightly larger than the convex portion 11a so that the convex portion 11a of the valve housing 11 can reliably fit in.

When the convex portion 11a of the housing 11 is fit into the concave portion 24a of the housing 24 of the operation unit 20, the operation element 21 of the operation unit 20 will face (oppose) the pilot valve element 33 via part of the wall 11w of the housing 11 and part of the wall 24w of the housing 24 of the operation unit 20. The walls 11w and 24w are made of resin through which a magnetic field passes. Accordingly, if the operation element 21 is rotationally controlled via the Geneva drive 25 and the facing sides of the operation element 21 and the pilot valve element 33 are the same polarity, the pilot valve element 33 is pressed down by the magnetic force to close the pilot valve 30 and close the flow path 14 using the valve element 15. On the other hand, if the operation element 21 is rotationally controlled via the Geneva drive 25 and the facing sides of the operation element 21 and the pilot valve element 33 are opposite polarities, the pilot valve element 33 is pulled upward by the magnetic force to open the pilot valve 30 and open the flow path 14 using the valve element 15.

In this way, in the valve system 1 that includes the main body 10 and the operation unit 20, the pilot valve element 33 is controlled via a magnetic field using the operation element 21 of the operation unit 20. Accordingly, it is unnecessary to mechanically operate the diaphragm 15 that is the valve element and the pilot valve 30 that drives the diaphragm 15. This means that it is possible to provide the valve system 1 where the diaphragm 15 that is the valve element and the pilot valve 30 that drives the diaphragm 15 are sealed by the valve housing (first housing) 11 in a state where mechanical access is not possible and the diaphragm 15 is operated by the operation unit 20 that can be detachably attached to the valve housing 11. Accordingly, aside from both ports 12 and 13, it is possible to make the valve housing 11a highly watertight housing. It is possible to connect the ports 12 and 13 to the pipes or hoses 8 and 9 and to prevent water from overflowing from the valve housing 11 or leaking when the operation unit 20 has been removed or separated from the valve housing 11 in a state where water is passing through the pipes 8 and 9.

In addition, in the valve system 1, the valve housing 11 and the housing 24 of the operation unit 20 include the convex portion 11a and the concave portion 24a respectively that fit together and by inserting the convex portion 11a of the valve housing 11 into the concave portion 24a of the housing 24 of the operation unit 20, it is possible to mechanically attach the operation unit 20 to the main body 10. The pilot valve element 33 that includes a permanent magnet (bar magnet) is housed in the convex portion 11a of the valve housing 11 and the operation element 21 that includes a permanent magnet (bar magnet) is housed in the housing 24 of the operation unit 20 so as to face the concave portion 24a. Accordingly, by merely mechanically attaching the operation unit 20 to the main body 10, the pilot valve element 33 and the operation element 21 face one another via the wall 11w of the housing 11 and the wall 24w of the housing 24. In the valve system 1, by merely attaching the operation unit 20 to the main body 10, a configuration capable of controlling the pilot valve element 33 via a magnetic field from the operation element 21 is automatically (autonomously) realized.

The convex portion 11a of the main body 10 and the concave portion 24a of the operation unit 20 are a configuration with a function of detachably attaching to each another and a function for determining the relative positions. This means that it is possible to easily attach and detach the operation unit 20 to and from the main body 10. It is possible for anyone to easily attach and detach the operation unit 20 to and from the main body 10 during battery replacement and the like. At a location where the attachment position of the valve system 1 makes operations difficult, it is possible to remove the operation unit 20 and then have the user operate the operation panel 43 in an easy-to-operate state to make settings of the valve system 1 and/or program the opening/closing function. Also, since the convex portion 11a and the concave portion 24a that attach or combine the main body 10 and the operation unit 20 are cylindrical or column-shaped, it is possible for the user to attach the operation unit 20 at a desired angle around the convex portion 11a of the main body 10.

The convex portion 11*a* of the main body 10 is provided not at the center of the main body 10, that is, not at the center of the valve housing 11, but at an off-center position shifted toward one of the ports 13. Accordingly, once the operation unit 20 has been attached to the main body 10, the valve main body 10 and the operation unit 20 are attached in a shifted state. This means that when disposing a plurality of valve systems 1 in a header or the like, it is possible to dispose the operation units 20 in a zigzag to reduce the occupied space and to lay out the plurality of operation units 20 so as to be easy to attach and detach.

In this valve system 1, by providing the convex portion 11*a* on the main body 10 and providing the concave portion 24*a* on the operation unit 20, the pilot valve element 33 and the operation element 21 are automatically disposed in a straight line by attaching the operation unit 20 to the main body 10. Such arrangement is an example of an arrangement suited to using a bipolar permanent magnet (bar magnet) as the operation element 21 and rotating the operation element 21 to move the pilot valve element 33 to switch the pilot valve 30 on and off. Instead of such arrangement, it is possible to reverse the convex portion and the concave portion and/or to dispose the pilot valve element 33 and the operation element 21 in parallel and move the pilot valve element 33 and the operation element 21 in synchronization via a magnetic field.

With the valve system 1, in place of the operation unit 20, it is possible to control opening and closing of the main body 10 by attaching a permanent magnet to the convex portion 11*a* using a ring-shaped unit or the like. As one example, by attaching a magnet that has the same polarity as the pilot valve element 33 to the convex portion 11*a*, it is possible to fix the pilot valve 30 at closed and by doing so fix the valve system 1 at closed. Using such attachment, it is possible to fix the main body 10 at closed position when the operation unit 20 is removed from the main body 10 so that water does not flow through the valve system 1. It is also possible to use a configuration where the pilot valve element 33 autonomously returns to one of the on and off states using an appropriate method such as a spring.

Note that although the present invention has been described with a valve system that moves or drive a diaphragm that is a valve element using a pilot valve as an example, for a small valve or a valve that operates a low pressure fluid, the invention may be a system where a magnet as a driving element is attached to the diaphragm 15 and the diaphragm 15 is driven more directly using a magnetic field from the operation unit 20. The valve element is also not limited to a diaphragm. In addition, although housings with walls made of resin have been described as an example of the sealed valve housing 11 and the housing 24 of the operation unit 20, the material that constructs the housing only needs to be a non-magnetic material, is not limited to resin, and may be a ceramic or the like. It is not necessary for the entire housings 11 and 24 to be entirely magnetically permeable and it is sufficient for parts of the walls of the housings 11 and 24 that construct the convex portion 11*a* and the concave portion 24*a* to be permeable. Also, although an embodiment of the present invention has been described using a two-way valve in the above description, the valve system 1 may be a three-way valve, a four-way valve, or the like.

The invention claimed is:

1. A valve system comprising:
   a main body that includes a valve element that controls flow of fluid between a plurality of ports,
   a driving element that is a first permanent magnet and is operated from outside the main body by a magnetic force, wherein the driving element directly or indirectly drives the valve element, and
   a first housing that houses the valve element and the driving element, and the first housing is watertight when pipes are connected to the plurality of ports and includes a convex wall portion in which the driving element moves up and down; and
   an operation unit that includes an operation element that is a second permanent magnet and generates a magnetic field that operates the driving element, a battery, an electric actuator for changing an orientation of the second permanent magnet of the operation element using power from the battery, and a control unit for controlling the electric actuator; and
   a second housing that houses the operation element, the battery, the electric actuator and the control unit, the second housing including a unitary, nonmagnetic wall having a concave wall portion into which the convex wall portion is inserted so that the convex wall portion nests within the concave wall portion, wherein the concave wall portion forms an integral portion of the second housing so as to seal the second housing, and the second housing separates the first housing from the operation element, the battery, the electric actuator and the control unit;
   a combination of the convex wall portion and the concave wall portion includes, when the convex wall portion is inserted into the concave wall portion, a region where the operation element and the driving element face one another through the convex wall portion and the concave wall portion, and being operable via only the magnetic field passing through the convex wall portion and the concave wall portion to change an orientation of a pole of the second permanent magnet of the operation element facing the driving element by the electric actuator included in the second housing when the first housing and the second housing are engaged, wherein the concave portion includes a portion that narrows towards the part where the operation element and the driving element face one another; and
   a hook portion that engages detachably the first housing and the second housing.

2. The valve system according to claim 1, wherein the first housing is sealed aside from the plurality of ports.

3. The valve system according to claim 1,
   wherein the operation unit includes a display panel, and
   the second housing is attached to the first housing in a manner so that it does not matter in which way the second housing is oriented with respect to the convex portion of the first housing.

4. The valve system according to claim 1, wherein the convex portion and the concave portion are provided at positions that are off-center with respect to at least one of the first housing and the second housing.

5. The valve system according to claim 1, wherein the driving element includes a pilot valve that drives the valve element via a fluid.

6. The valve system according to claim 1, wherein the operation unit includes a first operation unit that sets a schedule for operating the operation element using the control unit.

7. The valve system according to claim 6, wherein the operation unit further includes a second operation unit that manually operates the operation element using the control unit.

8. The valve system according to claim 1, wherein a portion of the convex wall portion engages with a portion of the concave wall portion.

9. The valve system according to claim 1, wherein a central portion of the convex wall portion abuts against a central portion of the concave wall portion.

10. The valve system according to claim 1, wherein a central portion of the convex wall portion lies flat against a central portion of the concave wall portion.

11. The valve system according to claim 1, wherein the hook portion is provided between a wide part of the concave portion and the convex portion.

12. A valve system comprising:
a main body that includes a valve element that controls flow of fluid between a plurality of ports,
a driving element that is a first permanent magnet and is operated from outside the main body by a magnetic force, wherein the driving element directly or indirectly drives the valve element, and
a first housing that houses the valve element and the driving element, and the first housing is watertight when pipes are connected to the plurality of ports and includes a convex wall portion in which the driving element moves up and down; and
an operation unit that includes an operation element that is a second permanent magnet and generates a magnetic field that operates the driving element, a battery, an electric actuator for changing an orientation of the second permanent magnet of the operation element using power from the battery, and a control unit for controlling the electric actuator; and
a second housing that houses the operation element, the battery, the electric actuator and the control unit, the second housing including a unitary, nonmagnetic wall having a concave wall portion into which the convex wall portion is inserted so that the convex wall portion nests within the concave wall portion, wherein the concave wall portion forms an integral portion of the second housing so as to seal the second housing, and the second housing separates the first housing from the operation element, the battery, the electric actuator and the control unit;
a combination of the convex wall portion and the concave wall portion includes, when the convex wall portion is inserted into the concave wall portion, a region where the operation element and the driving element face one another through the convex wall portion and the concave wall portion, and being operable via only the magnetic field passing through the convex wall portion and the concave wall portion to change an orientation of a pole of the second permanent magnet of the operation element facing the driving element by the electric actuator included in the second housing when the first housing and the second housing are engaged; and
a hook portion that engages detachably the first housing and the second housing;
wherein the concave portion includes a cylindrically depressed portion that narrows in multiple steps from a wide region to a narrow region towards the part where the operation element and the driving element face one another, and the hook portion is provided on the convex portion in a location such that the hook engages with the wide region when the first housing and the second housing are engaged with each other.

13. A valve system comprising:
a main body that includes a valve element that controls flow of fluid between a plurality of ports,
a driving element that is a first permanent magnet and is operated from outside the main body by a magnetic force, wherein the driving element directly or indirectly drives the valve element, and
a first housing that houses the valve element and the driving element, and the first housing is watertight when pipes are connected to the plurality of ports and includes a convex wall portion in which the driving element moves up and down; and
an operation unit that includes an operation element that is a second permanent magnet and generates a magnetic field that operates the driving element, a battery, an electric actuator for changing an orientation of the second permanent magnet of the operation element using power from the battery, and a control unit for controlling the electric actuator; and
a second housing that houses the operation element, the battery, the electric actuator and the control unit, the second housing including a unitary, nonmagnetic wall having a concave wall portion into which the convex wall portion is inserted so that the convex wall portion nests within the concave wall portion, wherein the concave wall portion forms an integral portion of the second housing so as to seal the second housing, and the second housing separates the first housing from the operation element, the battery, the electric actuator and the control unit;
a combination of the convex wall portion and the concave wall portion includes, when the convex wall portion is inserted into the concave wall portion, a region where the operation element and the driving element face one another through the convex wall portion and the concave wall portion, and being operable via only the magnetic field passing through the convex wall portion and the concave wall portion to change an orientation of a pole of the second permanent magnet of the operation element facing the driving element by the electric actuator included in the second housing when the first housing and the second housing are engaged; and
a hook portion that engages detachably the first housing and the second housing;
wherein the concave portion includes a cylindrically depressed portion that narrows from a wide region to a narrow region towards the part where the operation element and the driving element face one another.

* * * * *